US006282511B1

United States Patent
Mayer

(10) Patent No.: US 6,282,511 B1
(45) Date of Patent: Aug. 28, 2001

(54) VOICED INTERFACE WITH HYPERLINKED INFORMATION

(75) Inventor: Daniel Jitzchak Mayer, Warren, NJ (US)

(73) Assignee: AT&T, New York, NY (US)

( * ) Notice: Subject to any disclaimer, the term of this patent is extended or adjusted under 35 U.S.C. 154(b) by 0 days.

(21) Appl. No.: 08/759,916

(22) Filed: Dec. 4, 1996

(51) Int. Cl.$^7$ .................................... G10L 13/00
(52) U.S. Cl. ........................................ 704/270
(58) Field of Search .................... 704/270, 275, 704/255–257, 235, 260; 706/11; 707/501

(56) References Cited

U.S. PATENT DOCUMENTS

| 4,726,065 | * | 2/1988 | Froessl ................................. 704/275 |
| 5,333,237 | * | 7/1994 | Sefanopoulos et al. ............ 706/11 |
| 5,526,407 | * | 6/1996 | Russell et al. ...................... 704/270 |
| 5,699,486 | * | 12/1997 | Tullis et al. ......................... 704/275 |
| 5,774,628 | * | 6/1998 | Hemphill ............................ 704/255 |
| 5,781,913 | * | 7/1998 | Felsenstein et al. ............... 707/501 |
| 6,029,135 |   | 2/2000 | Krasle . |

FOREIGN PATENT DOCUMENTS 2307619   5/1997  (GB) .

OTHER PUBLICATIONS

Schmandt et al, "Augmenting a Window System with Speech Input," Computer Magazine, Aug. 1990, IEEE, pp. 50–56, vol. 23, No. 8.*

Arons, "Hyperspeech: Navigating in Speech–Only Hypermedia", Hypertext 1991 Proceedings, ACM, pp. 133–146.*

Page, J.H. et al., "The Laureate Text–To–Speech System—Architecture and Applications" *BT Technology Journal*, GB, BT Laboratories, vol. 14, No. 1, Jan. 1, 1996, pp. 57–67.

"Global Multimedia Hyperspace" IBM Technical Disclosure Bulletin, U.S., IBM Corp., New York, vol. 37, No. 1, Jan. 1, 1994, p. 357.

* cited by examiner

*Primary Examiner*—David D. Knepper

(57) ABSTRACT

An improved audio browser is disclosed. In an exemplary embodiment, a plurality of hypertext links (hereafter called "hyperlink words") available from, for example, a World Wide Web document, are used as a vocabulary of a speech recognizer for an audio browser. These hyperlink words are read to the user in the ordinary course of the audio browser's "speaking voice"—such hyperlink words being identified to the user by, for example, a change in voice characteristics for the "speaking voice." When a user wishes to select a hyperlink word, the user merely repeats the hyperlink word itself, rather than speaking a command or using a DTMF tone. The speech recognizer, which has as its vocabulary some or all of the hyperlink words of the document, recognizes the spoken hyperlink word and causes the jump to the linked address associated with the recognized hyperlink word.

60 Claims, 6 Drawing Sheets

VOICED INTERFACE WITH HYPERLINKED INFORMATION

FIELD OF THE INVENTION

This application is related to the art of user interaction with stored information, and more particularly, to such an interaction via spoken dialogue.

INTRODUCTION TO THE INVENTION

Software programs, known as "browsers," are popularly used for providing easy access to that portion of the Internet known as the World Wide Web (WWW). Examples of such browsers include the Netscape Navigator, available from Netscape Communications, Inc., and the Internet Explorer, available from Microsoft Corporation. These browsers are textual and graphical user interfaces which aid a computer user in requesting and displaying information from the WWW. Information displayed by a browser includes documents (or "pages") which comprise images, text, sound, graphics and hyperlinks, often referred to as "hypertext."

Hypertext is a graphical representation, in text form, of another address (typically of another document) where information may be found. Such information usually relates to the information content conveyed by the "text." The hypertext is not usually the address itself, but text conveying some information which may be of interest to the user. When a user selects a piece of hypertext (for example, by a mouse "click"), the browser will typically request another document from a server based on an address associated with the hypertext. In this sense, the hypertext is a link to the document at the associated address.

In addition to the conventional computer software browsers, other types of browsers are known. Audio browsers approximate the functionality of computer browsers by "reading" WWW document text to a user (listener). Audio browsers are particularly useful for persons who are visually impaired of persons who cannot access a computer but can access a telephone. Reading of text is accomplished by conventional text-to-speech (TTS) technology or by playing back pre-recorded sound. Hypertext is indicated to the listener by audible delimiters, such as a "beep" before and after the hypertext, or by a change of voice characteristics when hypertext is spoken to the listener. When a listener wishes to jump to the linked address associated with the hypertext, the listener replies with either a DTMF tone (i.e., a touch-tone) or speaks a command word such as "jump" or "link," which is recognized by an automatic speech recognition system. In either case, the audio browser interprets the reply as a command to retrieve the document at the address associated with the hypertext link just read to the listener.

SUMMARY OF INVENTION

The present invention is directed it an improved audio browser The inventor of the present invention has recognized that conventional audio browsers have a limitation which has to do with the use of simple command words or tones to select a hyperlink. In particular, the inventor has recognized that because the same command or tone is used to indicate a desire to jump to any hypertext-linked address, a conventional audio browser forces a listener (user) to select a given hypertext link before the listener is presented with the next hypertext link. Since hypertext links may be presented in rapid succession, or because a user may not know which hyperlink to select until the user hears additional hyperlinks, users of such audio browsers must use rewind and play commands to facilitate the selection of hypertext which was read but not selected prior to the reading of the next piece of hypertext.

The inventor of the present invention has further recognized that features of a speech recognition technique employed in computer browsers for sighted persons are useful in improving browsers meant for persons who cannot see a computer screen. See, e.g., U.S. patent application Ser. No. 08/460,955, filed on Jun. 5, 1995, which is hereby incorporated by reference as if fully disclosed herein.

In accordance with an embodiment of the present invention, a plurality of hypertext links (or, somewhat more descriptively, "hyperlink words") available from, for example, a WWW document, are used as a vocabulary of a speech recognizer for an audio browser. These hyperlink words are read to the user in the ordinary course of the audio browser's "speaking voice"—such hyperlink words being identified to the user by, for example, a change in voice characteristics for the "speaking voice." When a user wishes to select a hyperlink word, the user merely repeats the hyperlink word itself, rather than speaking a command or using a DTMF tone, as with prior art audio browsers. The speech recognizer, which has as its vocabulary some or all of the hyperlink words of the document, recognizes the spoken hyperlink word and causes the jump to the linked address associated with the recognized hyperlink word.

DETAILED DESCRIPTION

Figure 1:
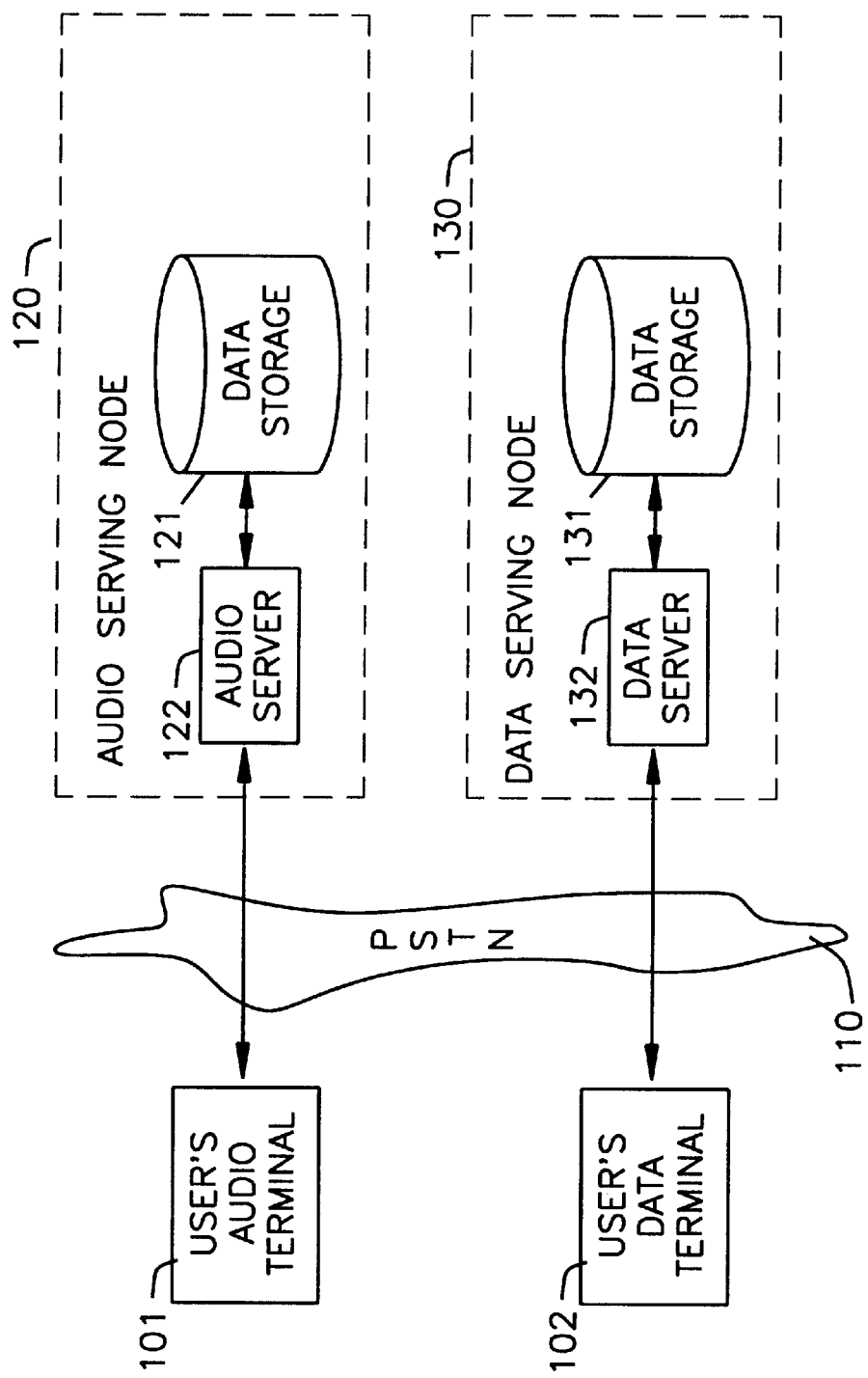
FIG. 1 provides a schematic depiction of a prior art information access system.

In the contemporary environment, an interface between a user and some information of interest to that user via an electronic medium has become almost ubiquitous. A typical illustration of such an interface is shown in FIG. 1, where a user, situated at User's Audio (e.g., telephonic) Terminal 101, obtains access via a communications path, illustratively depicted as a Public Switched Telephone Network (PSTN) 110, to an Audio Serving Node 120, in which Audio Server 122 provides an interface for the user to information stored in an associated database (Data Storage 121).

As also shown in the figure, a user might also obtain access to desired information from a text or graphics-based medium, such as User's Data (e.g., computer) Terminal 102. The user obtains access via a communications path, illustratively depicted as PSTN 110, to a Data Serving Node 130, in which Data Server 132 provides an interface for the user to information stored in an associated database (Data Storage 131).

While it is known to provide access from such a text or a graphics-based interface device to highly complex and multi-layered information sources, the voice-based interfaces known in the prior art are able to provide access to only a highly limited scope of such information, as described hereinbefore.

It is, however, well known in the art to provide text-based information (including transactional options) arranged either in linked layers of increasing (or decreasing) complexity and/or detail, or in a network of links designating logical relationships. Where information is arranged in hierarchial layers, linkages between such layers are typically established on the basis of key words or phrases deployed in a particular layer, where each such key word provides a linkage to related information, typically in another layer. While the discussion herein is focused on access to information stored in hierarchial layers, it should be noted that this usage is exemplary and is not intended to limit the scope of the invention. In fact, the invention pertains to all types of logical linkages.

A highly-used case of such a text-based set of hierarchial linked information layers is found in the method known as HyperText Markup Language, or HTML. HTML provides important functionality for the World Wide Web. With the WWW, an initial layer, or "home page", is presented to a user, with that home page typically offering a comparatively high level description of information related to the subject matter or application associated with that Web site. For a user wishing to pursue more detail, or particular transactions, related to that home page information, key words or phrase are highlighted in the home page text, which are linked to such greater detail and/or specific transactions—such links being provided by the HTML functionality.

In a typical HTML application, a page of text would be displayed to a user on a monitor associated with a personal computer (the initial such page typically called the home page), with hypertext (or hyperlink words) in that text displayed in a particular color and underlined, or in some other way differentiated from the typeface associated with the regular text. A user wishing to access the underlying (or related) information for such a hyperlink word would locate the hypertext with a mouse pointer or cursor, and signal an intent to access the underlying information by either clicking a mouse button or pressing the "enter" key on a keyboard.

I. Introduction To An Illustrative Process In Accordance With The Invention.

In accordance with an illustrative embodiment, a voiced user interface to a layered set of interlinked information is provided through an initial establishment of the desired information database as a text-based set of linked HTML layers (hereafter sometimes called HTML "pages"). These pages may be stored at a single server or at a plurality of networked servers. In accordance with an embodiment of the invention, the text of a given HTML page is then caused to be translated to a voiced form, where hyperlink words in that text are rendered in a distinctive voicing from that of other text. The user interacts with this voiced information system by repeating (i.e., voicing) a hyperlink word representing a point where additional, related information is desired, and an automatic speech recognition system recognizes an utterance of a given hyperlink word by the user. Upon such recognition of the given hyperlink word, a jump is made to the information layer corresponding to that given hyperlink word and thereafter the text of the new information layer is caused to be translated to a voiced form.

In accordance with the embodiment of the invention, the text of an HTML page is converted to a voiced form. That voiced HTML text will then be played to a user via any of numerous well known communication links, including, in the preferred embodiment, a telephonic link. Such a translation of text to voiced form is very well known and typically would be carried out by a text-to-speech synthesizer (TTS). Such TTS systems are themselves well known. Exemplary such TTS systems are described in U.S. Pat. Nos. 4,685,135; 5,157,759; and 5,204,905.

Because a user interfacing with the voiced information service of the embodiment will indicate an interest in exploring another layer of the linked information by a response directed to the hyperlink word related to the additional information, it is desirable that the voiced information provide an aural distinction between a hyperlink word and other voiced text. There are various known methods in the TTS art for creating voicing distinction as to different portions of a synthesized text. One exemplary such method, which represents an illustrative embodiment of the invention, is to cause the ordinary text to be provided in a male voice and the hyperlink word to be rendered in a female voice, or vice versa. The changing of voices in the TTS art is a well known process.

As a user is listening to the voiced text for a given layer of information, and hears a hyperlink word, the user has two choices. He can continue listening to the enunciated text (corresponding to a continued reading of an HTML page). Alternatively, if the hyperlink word prompts a desire to pursue more detailed information related to that hyperlink word, he can indicate, by repeating the word, his selection of the word. That voiced user response will be conveyed to a speech recognizer associated with the information system via a communications link, which may be the same communications link as used for providing the enunciated information text to the user. Such speech recognizers are also well known in the art.

The function of the speech recognizer in the system of the invention is to recognize the voiced response of the user as either one of the hyperlink words in an information layer under consideration, or one of a small number of reserved "action" words (e.g., commands) which are established to cause the system to take certain actions. Thus the hyperlink words, along with the action words, serve as a portion of the vocabulary of the speech recognizer. The action words, which are reserved and therefore cannot be used as hyperlink words, are of the sort: "stop", "back", "start", "slower", "faster", etc., and generally would be established by the system operator. It is of course preferable that the set of action words be small, and that the same set be maintained in common across all applications of the model.

The speech recognition function for the system of the invention is particularly easy to implement because the speech recognizer generally needs only be able to recognize a small vocabulary of words at any given point in time—the vocabulary of hyperlink words and action words. To aid recognizer performance, a sliding window of hyperlink words may be used to define the recognizer vocabulary, so that, at any given point in time, that vocabulary would include the most recently played hyperlink word and some number of hyperlink words enunciated earlier (but, in general, less than the total of all previously played links), Accordingly, by using a sliding window (which tracks the enunciator) for the speech recognizer vocabulary, comprising a given hyperlink word and the additional words within some interval (which may include additional hyperlink words), the word recognizer need only be able to recognize hyperlink words appearing in that interval (plus the system action words). Moreover, because the TTS system which provides the enunciation of those hyperlink words is part of the same system as the word recognizer, the word recognizer and the TTS system are able to share certain speech data, such as phonemic sequences of hyperlink words, which helps to keep the TTS system and the recognizer's "window" synchronized.

Upon recognition by the word recognizer of a hyperlink word spoken by the user, a signal is then generated indicating that a particular hyperlink word has been selected by the user. Using methodologies analogous to those used in a purely text-based hypertext system, this recognition of a particular hyperlink word operates to cause the system to jump to the information layer linked to that hyperlink word. When that linked layer is reached, the text in that layer is similarly translated to a voice form for communication to the user, and will be subject to further user response as to the selection of hyperlink words or system action words within that new layer. As with existing text-based technologies such as the World Wide Web, one or more of the linked information layers may well reside in storage media associated with servers operating at other locations, where that link is established via a communications path between a first server and the linked server.

Note also that, at any layer, part or all of the information may be prerecorded human voice and stored audio information, such as provided over the World Wide Web by streaming audio—e.g., RealAudio™ from Progressive Networks, Inc. In this case, hyperlink words may be distinguished by recording such hyperlink words in a voice of opposite gender from that used for other text.

II. Implementation of the Illustrative Process

Figure 2:
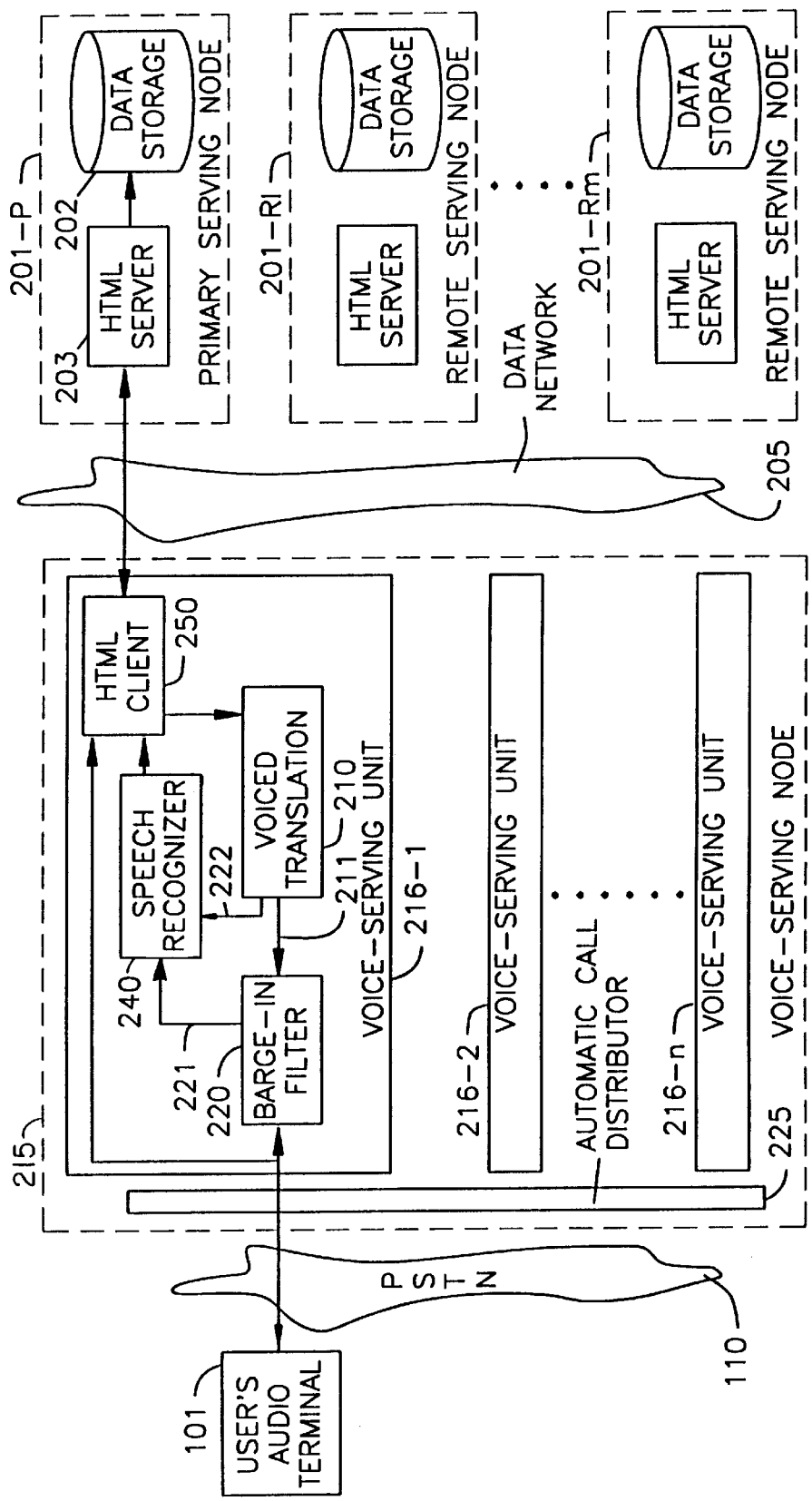
FIG. 2 provides a schematic depiction of the voiced information access system of the invention.

In FIG. 2, a system for implementing the method of the invention is depicted. Referring to that figure, a set of HTML pages representing an information database of interest will be provided in Data Storage 202, which, along with associated HTML Server 203, comprise Primary Serving Node 201-P. Note, however, that sub-layers or related portions of the information set may be stored at Remote Serving Nodes 201-R1–201-Rm, each such Remote Serving Nodes including an HTML Server and an associated Data Storage means. Each Remote Serving Node will in turn be linked to Voice Serving Node 215, and other serving nodes via a Data Network 205—e.g. the Internet.

In response to a request for access to that data set (e.g. ,through the arrival of a phone call from User's Audio Terminal 101 through PSTN 110), the Automatic Call Distributor 225 in Voice Serving Node 215 assigns an available Voice Serving Unit 216-1 to the service request. In the assigned Voice Serving Unit, the HTML Client 250 will cause the first of the HTML pages (the "home page") to be called up from Primary Serving Node 201 for further processing by the assigned Voice Serving Unit. (Primary Serving Node 201 may be collocated with Voice Serving Node 215.) The HTML home page (supplied by HTML Server 203 from Data Storage 202 in Primary Serving Node 201 to HTML Client 250 in Voice Serving Unit 2161) will then typically be translated to a voice form by Voiced Translation means 210, which will typically be realized with a TTS system. Note that the voiced form of some or all HTmL "pages" may have been obtained and stored prior to the user's access/request, not necessarily immediately following that access/request. Caching techniques, well known in the art, may determine which voice forms will be prestored, and which generated in response to a user request.

The voiced text from the HTML home page will then be transmitted over communications link 211 to the Barge-In Filter 230, from which it can be heard by the user through User's Audio Terminal 101. As the user listens to the HTML page being enunciated by the Voiced Translation means, he may hear a hyperlink word for which he wishes to obtain additional or related detail (or to trigger a transaction as described below); to indicate this desire for such additional or related detail, he will repeat (speak) the hyperlink word through User's Audio Terminal 101. That voiced response from the user is processed through Barge-In Filter 220 and transmitted to Speech Recognizer 240 over communications link 221.

An important function of Barge-In Filter 220 is to ensure that only the words uttered by the user (excluding the words enunciated by the Voiced Translation means) are inputted to Speech Recognizer 240. Such Barge-In Filters are known in the art and operate by subtracting electrical signals generated from a known source (Voiced Translation means) from the total mix of that known source and user-uttered words; for the purpose of this disclosure, the Barge-In Filter is also understood to operate as an echo canceler, compensating for the imperfections in the transmission path between the user and the Voice Serving Unit.

Speech Recognizer 240 synchronizes its recognition vocabulary (with hyperlink words that may be uttered by the user over time) through Communications Link 222 from Voiced Translation means 210. Upon recognition of a selected hyperlink word by the Speech Recognizer, a signal related to that word is sent from the Recognizer to the HTML Client 150 which converts that signal into an appropriate code for the HTML Server as indicative that a hyperlink should be established to the information layer/location linked to the selected hyperlink word—this action is analogous to a user clicking a mouse with the cursor pointed at the hyperlink word and the system response thereto.

Figure 3:
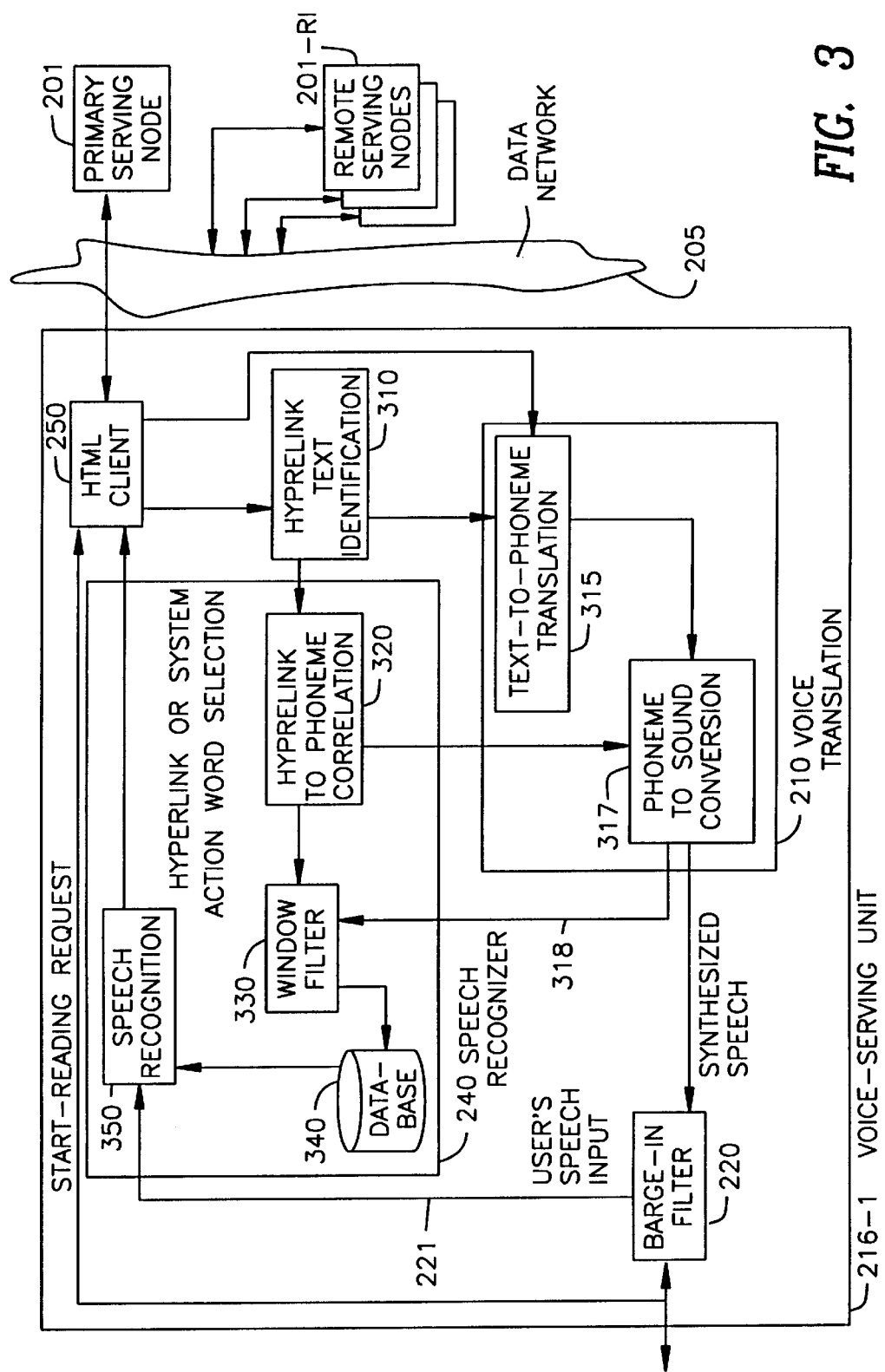
FIG. 3 provides a more detailed view of some of the functions shown schematically in FIG. 2.

FIG. 3 presents a more detailed view of some of the salient functions presented in FIG. 2. In particular, FIG. 3 presents the functions which perform the TTS process of Voiced Translation 210 (which includes conventional Text-To-Phoneme Translation processor 315 and Phoneme-To-Sound Conversion processor 317), the Hypertext Identification processor 310, which operates on a stream of text available from an HTML document page, a Hypertext-to-Phoneme Correlator 320, for correlation of identified hypertext with phoneme strings, and a Window Filter 330, which determines which of the identified sequences of hypertext text should be used by a Speech Recognition processor 350 as part of the vocabulary for the recognizer system.

In accordance with the described embodiment, a given HTML document page (for aural presentation to a system user) is retrieved by HTML Client 250 from Primary Serving Node 201 and made available for further processing. The given HTML document page is analyzed by Hypertext Identification processor 310 to identify the hypertext on the page. An output from Hypertext Identification processor 310 is provided to Hypertext-to-Phoneme Correlator 320, and a signal derived from that output is provided to Phoneme-To-Sound Conversion processor 317, in order to facilitate differential voicing between the hyperlink words and other text in the HTML page.

The text on the document page is also provided to Voiced Translation (TTS) system 210 for conversion to speech. This is accomplished through a conventional two-step process of translating text to sequences of phonemes by Text-To-Phoneme Translation processor 315 and a phoneme to sound conversion by Phoneme-To-Sound Conversion processor 317.

Correlated hypertext and phoneme sequences are presented to a Window Filter 320 which identifies which of the hyperlink words/phrases that have been played to the user up to a given time will form the vocabulary of the speech recognizer (along with the system action words). This Window Filter 330 will select the most recently played hypertext and all preceding hypertext within a certain duration in the past (which could be measured in, for example, seconds or words). The Window Filter 330 receives synchronization information concerning the words most recently played to the user from Phoneme-To-Sound processor 317 via Communications Link 318. The results of the window filter process—i.e., the sequence of hyperlink words/phrases occurring within the duration of a given window—are stored in a Database 340 along with phoneme models of such speech (typically implemented as independently trained hidden Markov models (HMMs)). Database 340 will, of course, also contain phoneme models of the system action words. A conventional Automatic Speech Recognition processor 350 receives unknown speech from the user (via Barge-In Filter 220 and Communications Link 221) and operates to recognize the speech as one of the current vocabulary of hyperlink words or a system action word. The Speech Recognition processor 350 interacts with Database 340 to do conventional—e.g., Viterbi—scoring of the unknown speech with the various models in the database. Upon recognition of a hyperlink word/phrase or a system action word, an output of the recognizer system is provided to Primary Serving Node 201 for action appropriate to the selected hyperlink word (e.g., retrieval of the commensurate HTML "page") or the system action word.

Window Filter 330 may be flat-weighted, admitting all hyperlink words enunciated in the predefined time-window into the vocabulary of the Speech Recognizer with equal probability; alternatively the Window Filter may provide time-defined, "contextual smoothing", admitting more recently-enunciated hyperlink words into the vocabulary of the Speech Recognizer with higher probability than words articulated earlier in the recognition window. These probabilities are taken into account by Speech Recognition processor 350 when performing recognition.

Certain system-action words refer to the activity of the Phoneme-to-Sound conversion means (e.g., "faster", "slower", . . . ). When such words are recognized by Speech Recognition processor 350, the signal identifying each of them is transmitted to the Voiced Translation means for appropriate action.

Figure 4:
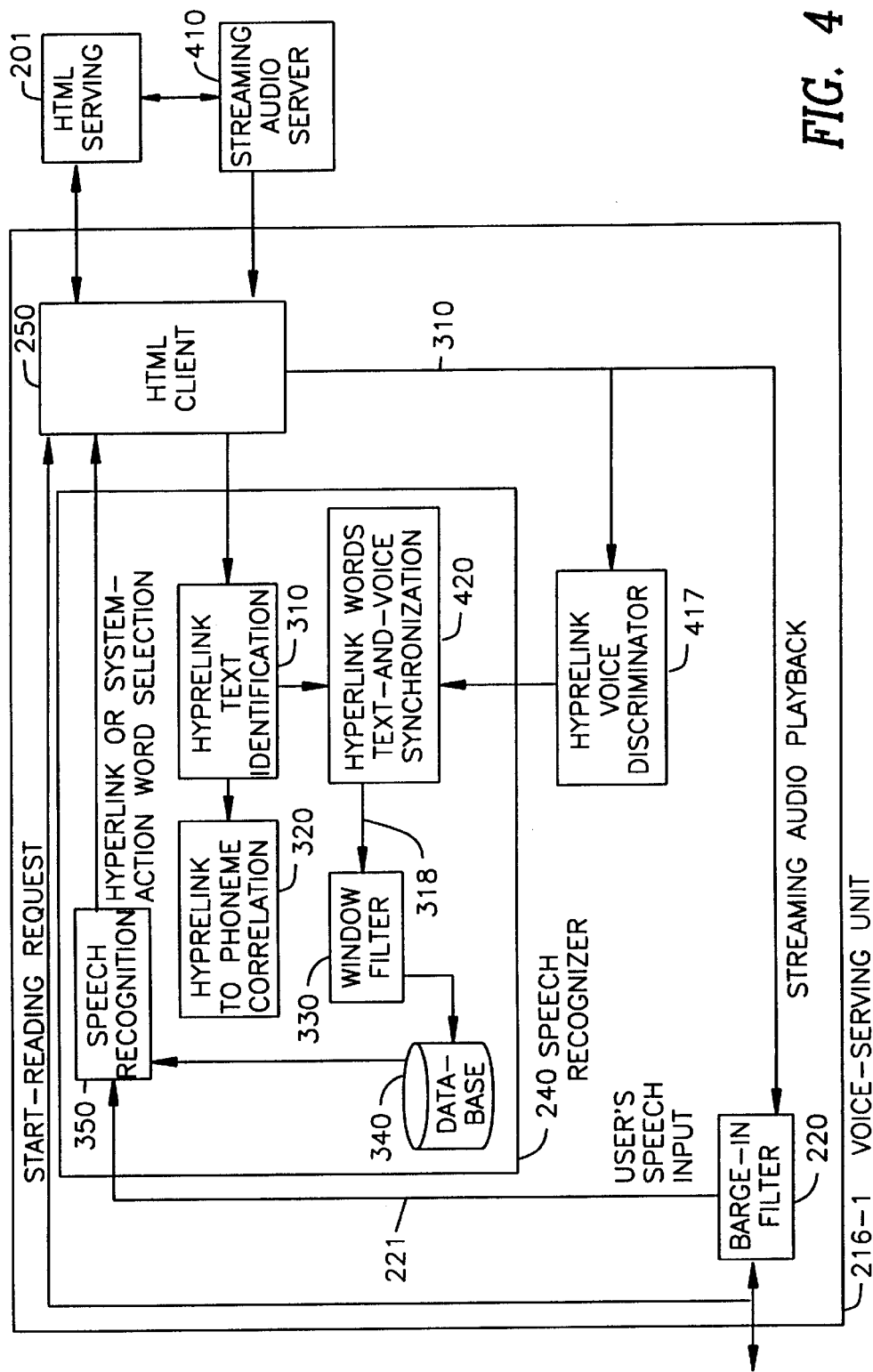
FIG. 4 provides a schematic depiction of an embodiment of the system of the invention where information provided as prerecorded voice or other audio content.

It should also be understood that pre-recorded voice or audio content (e.g., music) can be used, rather than enunciated text-to-speech, at any point within the user experience. When human voice is desired rather than enunciated text, then operation of the system is as illustrated in FIG. 4. As can be seen in the figure, the data source in this embodiment consists of Server 201 along with streaming Audio Server 410 (each such server including an appropriate storage means). Note that HTML Server 201 and Streaming Audio Server 410 may be implemented as a single server or separately, and each may consist of multiple physical servers, collocated or remote. The data provided by HTML Server 201 is textual HTML pages as with the previously described embodiment. For the Streaming Audio Server, however, the data content comprises prerecorded speech segments corresponding to a portion or all of a set of hypertext data to be made available to the user—such speech segments typically being established by humans recording the hypertext data material as a precise reading script. In an exemplary embodiment, the textual portion of the data in question is read (and recorded) in a male voice, and the hyperlink words are read in a female voice (having a distinct pitch from the male voice). Any segment to which a link can be established is recorded separately. Playout of the streaming audio segments will be controlled by the HTML Server.

The system operation for this embodiment proceeds as described for FIG. 3 except that the user is presented with streaming-audio playback (for at least selected data segments) instead of enunciated voice. All hyperlink words played out over Communications Link 310 penetrate through the Hyperlink Voice Discriminator 417 into the Hyperlink Words Text and Voice Synchronization means 420. Hyperlink Voice Discrimination operates to distinguish voicing for hyperlink words from that for other text—in the exemplary embodiment, to discriminate the female voice (hyperlink words) from the male voice (other text). As before, Hyperlink Text Identification means 310 feeds hyperlink words (text form) through, this time to Hyperlink Words Text and Voice Synchronization means 420, which operates, in a manner well known in the art, to track the progress of the streaming audio hyperlink words with the textual version of the same words, thus providing required synchronization signals to Window Filter 330. The user interfaces with the system in exactly the same manner, and the Speech Recognizer means operates as before. When a hyperlink word is recognized, the HTML Client is triggered as before, and the HTML Server causes the Streaming Audio Server to move to the requested prerecorded segments and continue playing that new segment to the user.

Figure 5:
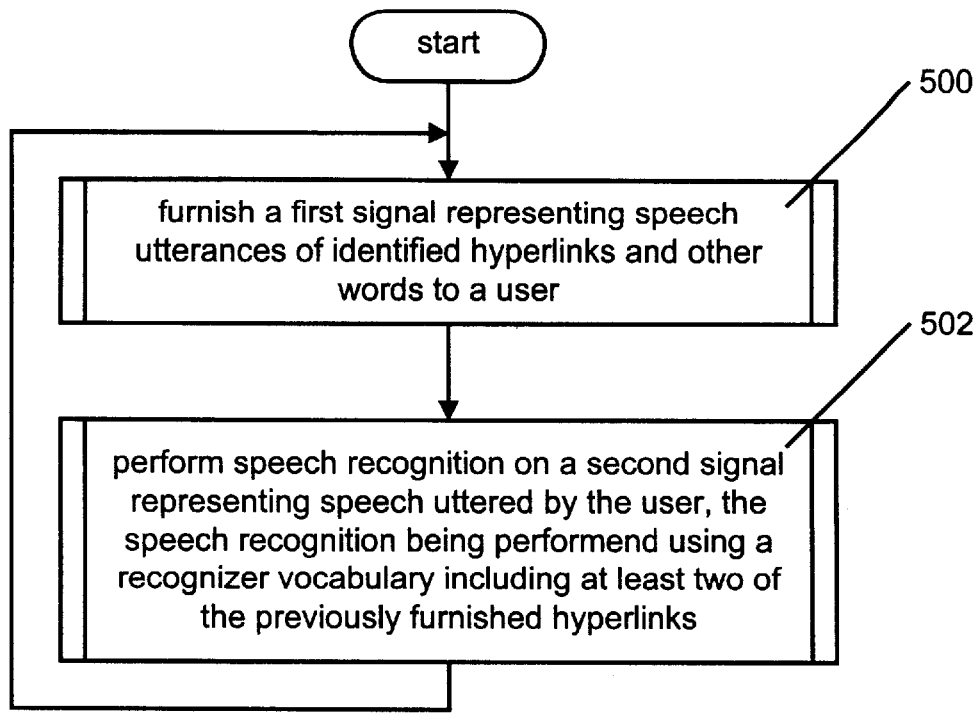
FIGS. 5, 6, and 7 provide simplified flow charts depicting exemplary steps performed in accordance with the principles of this invention.
Figure 6:
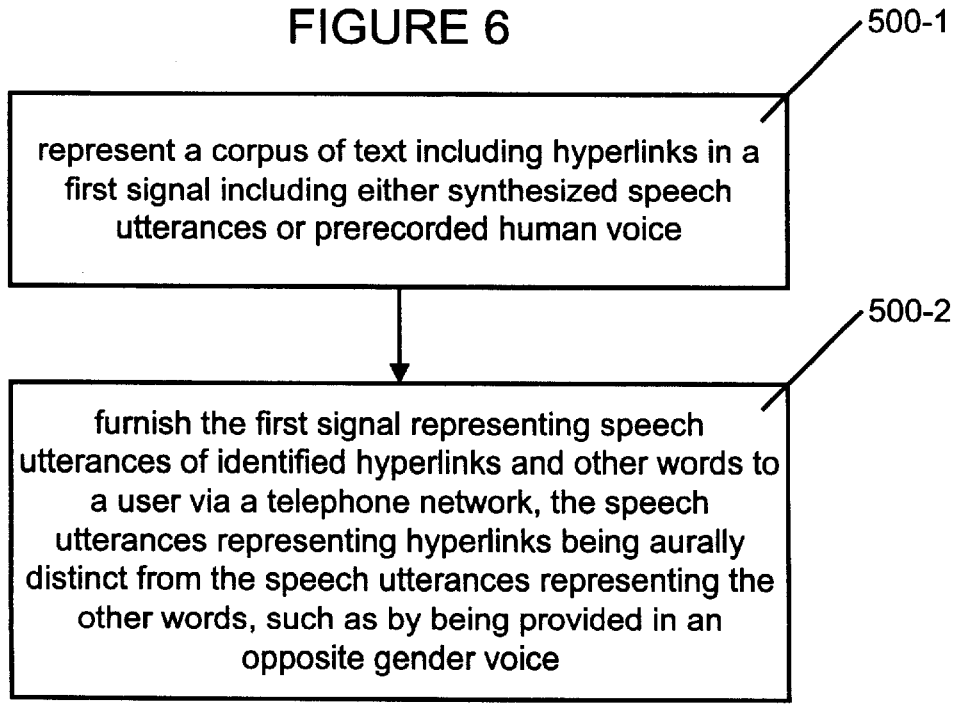
Figure 7:
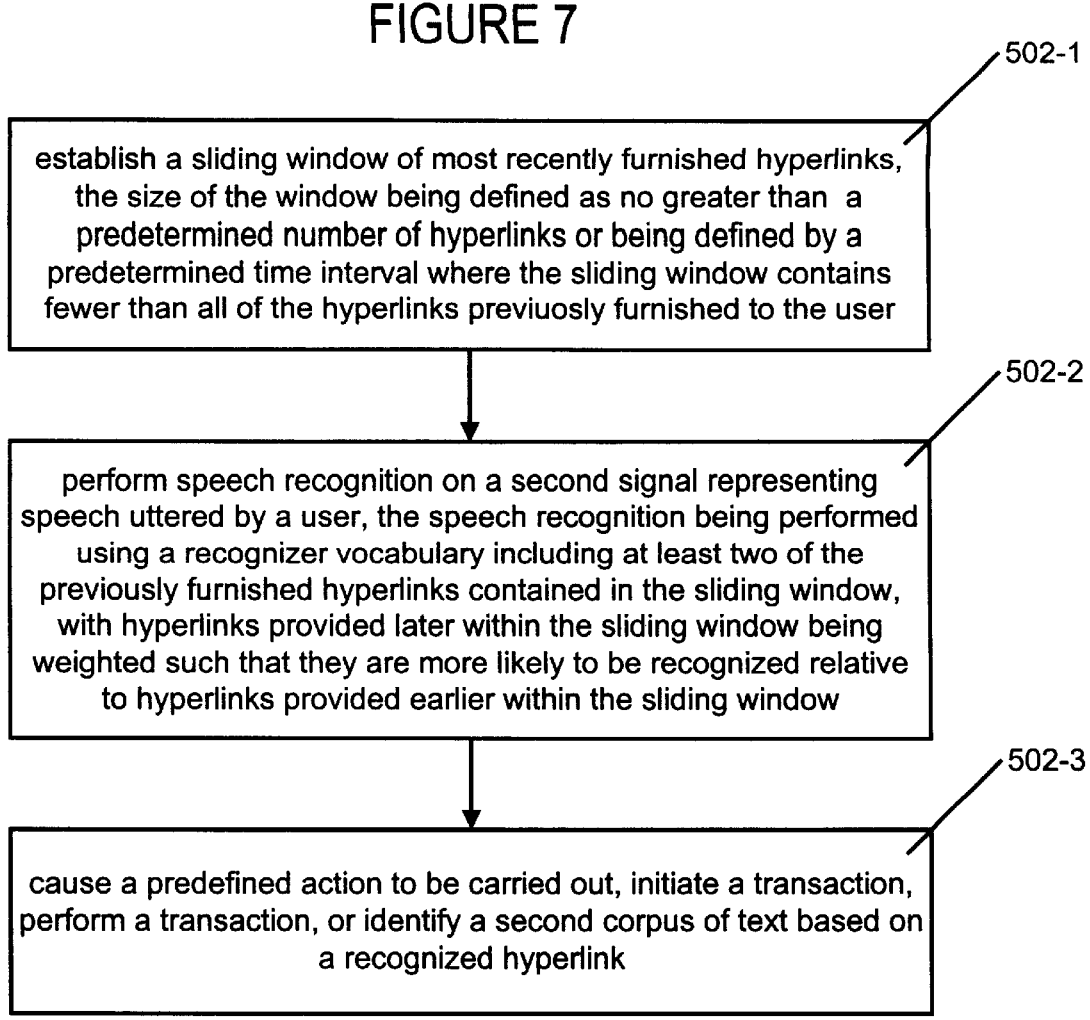

Exemplary steps performed in accordance with the principles of this invention are depicted at a high level of abstraction in FIGS. 5, 6, and 7. FIG. 5 depicts the step of furnishing a first signal representing speech utterances of identified hyperlinks and other words to a user, as depicted at 500. Step 500 is shown in more detail in FIG. 6. FIG. 5 also depicts the step of performing speech recognition on a second signal representing speech uttered by the user, the speech recognition being performed using a recognizer vocabulary including at least two of the previously furnished hyperlinks, as depicted at step 502, which is shown in more detail in FIG. 7.

FIG. 6 depicts step 500 in more detail as follows. FIG. 6 depicts, at 500-1, the step of representing a corpus of text including hyperlinks in a first signal including either synthesized speech utterances or prerecorded human voice. The step of furnishing the first signal representing speech utterances of identified hyperlinks and other words to a user via a telephone network, where the speech utterances representing hyperlinks are aurally distinct from those representing the other words is depicted at 500-2. As previously mentioned, the utterances representing hyperlinks could be provided in a voice of the opposite gender relative to the gender of the voice used for providing the other words.

FIG. 7 depicts step 502 in more detail as follows. FIG. 7 depicts, at 502-1, the step of establishing a sliding window of most recently furnished hyperlinks, the size of the window being defined as no greater than a predetermined number of hyperlinks or being defined by a predetermined time interval where the sliding window contains fewer than all of the hyperlinks previously furnished to the user. The step of performing speech recognition on a second signal representing speech uttered by a user, the speech recognition being performed using a recognizer vocabulary including at least two of the previously furnished hyperlinks contained in the sliding window, with hyperlinks provided later within the sliding window being weighted such that they are more likely to be recognized relative to hyperlinks provided earlier within the sliding window is depicted at 502-2. The step of causing a predefined action to be carried out, initiating a transaction, performing a transaction, or identifying a second corpus of text based on a recognized hyperlink is depicted at 502-3.

III. Application of Methodology of Invention

Embodiments of the present invention can solve many problems associated with conventional voice information systems. For example, conventional voice information systems are often difficult to design and use. This difficulty stems from the problem of designing a "user friendly" system for presenting a variety of options to a listener, often in nested hierarchial form, from which the listener must select by pressing touch-tone keys. The difficulty of this design task manifests itself to any user who, for example, encounters for the first time an automated transaction system at a banking or brokerage institution. Users often complain that nested hierarchies of voice "menus" are difficult to navigate through. By contrast, the present invention provides a much more intuitive interface to navigate through information and select desired options. With the present invention, a user speaks the options the user desires, facilitating more intuitive (e.g.,hands-free, eyes-free) and successful encounter with the system. Additionally, with the method of the invention, the user is much more likely to be aware of options available when selecting a specific option, because of the way the information is presented and the multiple spoken language options available at any point. There is no need to associate concepts with numbers as in many prior-art methods.

The invention also solves a problem of sate-of-the-art voice recognition systems concerning the recognition of free-form, unconstrained phrases. By presenting a browser with spoken hyperlink words to be repeated, the system "knows" in advance the limited set of words that are likely to be spoken by a listener in selecting hypertext. As such, the system can recognize virtually any spoken word or phrase a voice-information system designer may devise. The designer is not limited to selecting a small vocabulary (corresponding to the voice information system context) for use in recognition, or among a few alternatives, just to maintain recognizer accuracy.

Also, embodiments employing the window filter facilitate enhanced voice recognition performance through the use of a temporal limit minimizing the vocabulary of the recognized. Thus, the recognizer does not attempt (or need) to recognize all words (selected by the designer as hypertext) all of the time. This improves recognizer performance, since correct recognition is more difficult when a vocabulary is large due to, for example, the presence of all words a recognizer need to recognize over time and their possible synonyms.

The invention also allows the designer of voice information systems to take advantage of plentiful HTML authoring tools, making design of such systems easy.

Other benefits of embodiments of the present invention include the designation of a recorded path through information space which can be replicated later in expanded HTML media—for example, a user can navigate in information space using a telephone, then direct the system to deliver text and associated images (encountered along the same path) to a fax machine or as an attachment to an electronic mail message; the opening of parts of the WWW to users of telephones and sight-impaired users of PCs; the integrated use of voice messaging and e-mail; and the affording of a more general applicability of voice information systems around the world in locations which do not employ touch-tone telephones.

IV. Conclusion

A system and method for voiced interaction with a stored information set has been described herein that provides for the presentation of an information set of greater complexity than that handled by the prior art, as well as a substantially simpler and more intuitive user interface. In an exemplary application of the invention, an entity wishing to make a collection of information available to a set of users, or potential users, would cause that information to be authored into a set of linked HTML pages, which HTML data would be loaded into a storage medium associated with one or more serving nodes. A means for accessing the serving node, such as a toll-free telephone number, would then be established. Typically, information as to the availability of the information set (as well as the means for access) would be published and/or advertised to users and/or potential users. Upon accessing the serving node, a user would be greeted by an enunciation of text appearing in the "Home Page" of the HTML database, where hyperlink words in that Home Page are enunciated in a distinct manner from that of the regular text. The user would then "barge in", after hearing a hyperlink word as to which more information is sought (during an adjustable time window after the hyperlink word is enunciated), by repeating that hyperlink word. That "barge in" repeat of the hyperlink word would be recognized (from multiple such words "active" within that time window) by a speech recognizer associated with the serving node, and that recognition would be translated to a signal indicating selection of the particular hyperlink word, causing the server to create a hyperlink to the HTML point linked to that hyperlink word, or to trigger a transaction such as the buying or selling of stocks, or the linking of a user's telephone to that of another for a subsequent conversation.

Although the present embodiment of the invention has been described in detail, it should be understood that various changes, alterations and substitutions can be made therein without departing from the spirit and scope of the invention as defined by the appended claims. In particular, the system may be modified such that, upon recognition of a hyperlink word voiced by a user, that word is repeated back to the user as a confirmation of his choice. In the absence of a user response, such as "wrong" or "stop" within a short interval, the system would proceed to implement the hyperlink to the HTML layer linked to that word. As an additional modification of the system and method described herein, an HTML page containing graphic data (which, of course, cannot be conveyed orally) could be structured so that a phrase such as "image here" would be voiced to indicate the presence of such an image. As an additional feature, the system could be caused to interrogate a user indicating an interest in such image to provide the user's fax number, whereupon a faxed copy of the page containing the image of interest could be sent to the user's fax machine. As a still further modification, portions of the data could be stored in an audio form, and the presentation of that audio data made to the user establishing a connection to the serving node via a technology known as streaming audio, a well-known WWW technique for providing to an HTML client real-time digitized audio information.

Further, the process by which a user navigates from the voiced HTML Home Page to the voiced detail of lower, or related, layers in accordance with the present invention provides all of the advantages of an interactive voice response ("IVR") system—as, for example, with automated call attendant systems, but without the need to deal with limiting, and often frustrating menu structures of IVRs.

Instead, that navigational process would work consistently, regardless of specific content, in essentially the same way as the text-based navigation of the World Wide Web arrangement, where a user proceeds from a Home Page down to a layer representing information of interest. And, as is well known, that WWW HTML system not only provides a highly versatile information access medium, but it has also been shown to have an essentially intuitive navigation scheme which is substantially user friendly. Thus, a user need only learn the model for this interface once, and thereafter will find that an interaction with a separate database using that model provides a corresponding navigation scheme regardless of the contents of the database. Moreover, the underlying data reached by accessing a hyperlink word will behave in a corresponding manner to that of the model learned.

In the authoring of the information of interest into HTML pages, it will be preferable that the hyperlink words/phrases be relatively "compact"—i.e., typically containing one or two words—and sparse, in order to both enhance recognition system performance and make the method of the invention more useful to a user.

What is claimed is:

1. A method of facilitating the selection of a hyperlink from among a plurality of hyperlinks presented to a user in audio form, said method comprising the steps of:

furnishing to said user a first signal representing speech utterances of said plurality of hyperlinks and one or more other words, wherein said signal includes an identification of said hyperlinks;

performing speech recognition on a second signal representing speech uttered by said user, said speech recognition being performed with use of a recognizer vocabulary which comprises entries corresponding to at least two of said hyperlinks said at least two of said hyperlinks having been provided within a sliding window of said plurality of hyperlinks presented in audio form, said sliding window including no more than a predetermined number of most recently provided hyperlinks of said plurality of hyperlinks presented in audio form.

2. The method of claim 1 wherein said furnishing step comprises synthesizing said speech utterances represented in said first signal based on a corpus of text, said corpus including said plurality of hyperlinks.

3. The method of claim 2 wherein sad corpus of text comprises text of a document provided by a computer network server.

4. The method of claim 3 wherein said document comprises an HTML page.

5. The method of claim 1 wherein at least a portion of said speech utterances represented in said first signal comprise prerecorded human voice.

6. The method of claim 1 wherein said utterances of hyperlinks furnished to said user are aurally distinct from said utterances of said other words.

7. The method of claim 1 wherein said first and second signals are carried over a telephone network, and further wherein at least a portion of a routing of said signals is based on a recognized hyperlink.

8. The method of claim 1 wherein said at least two of said hyperlinks includes less than all hyperlinks in said plurality of hyperlinks.

9. The method of claim 1 further comprising the step of selecting said recognizer vocabulary entries to be a subset of said hyperlinks furnished to said user.

10. The method of claim 1 further comprising the step of selecting said at least two of said hyperlinks in accordance with a sliding window of time defining a subset of said plurality of hyperlinks said sliding window of time having a predetermined duration.

11. The method of claim 10 wherein the step of performing speech recognition further comprises selecting a particular hyperlink as a recognition result from among said at least two of said hyperlinks based on how recently a portion of said first signal corresponding to a particular hyperlink within said sliding window of time was furnished to said user.

12. The method of claim 1 wherein said hyperlink entries comprising said recognizer vocabulary for said speech recognition are limited to a subset of said plurality of hyperlinks which have occurred in said first signal during a predefined interval.

13. The method of claim 12 wherein each of said hyperlink entries comprising said recognizer vocabulary has an equal likelihood of representing an unknown speech utterance in said second signal.

14. The method of claim 12 wherein any one of said hyperlink entries comprising said recognizer vocabulary has a likelihood of representing an unknown speech utterance in said second signal which is weighted according to a temporal position of said any one hyperlink in said predefined interval.

15. The method of claim 1 further comprising the step of causing a predefined action to be carried out based on a recognized hyperlink.

16. The method of claim 1 further comprising the step of initiating a transaction based on a recognized hyperlink.

17. The method of claim 1 further comprising the step of performing a transaction based on a recognized hyperlink.

18. The method of claim 2 further comprising the step of identifying a second corpus of text based on a recognized hyperlink.

19. The method of claim 18 wherein said second corpus of text comprises text of a document located on a computer network server.

20. A system for facilitating the selection of a hyperlink from among a plurality of hyperlinks presented to a user in audio form, said system comprising:

an interface providing to said user a first signal representing speech utterances of said plurality of hyperlinks and one or more other words, wherein said signal includes an identification of said hyperlinks;

a speech recognizer for performing speech recognition on a second signal representing speech uttered by said user, said speech recognition being performed with use of a recognizer vocabulary which comprises entries corresponding to at least two of said hyperlinks said at least two of said hyperlinks having been provided within a sliding window of said plurality of hyperlinks presented in audio form, said sliding window including no more than a predetermined number of most recently provided hyperlinks of said plurality of hyperlinks presented in audio form.

21. The system of claim 20 wherein said interface operates to synthesize said speech utterances represented in said first signal based on a corpus of text, said corpus including said plurality of hyperlinks.

22. The system of claim 21 including a means for identifying a second corpus of text based on a recognized hyperlink.

23. The system of claim 22 wherein said second corpus of text comprises text of a document located on a computer network server.

24. The system of claim 20 wherein said corpus of text comprises text of a document provided by a computer network server.

25. The system of claim 20 wherein at least a portion of said speech utterances represented in said first signal comprise prerecorded human voice.

26. The system of claim 20 wherein identification of said hyperlinks in said first signal is carried out by providing said utterances of hyperlinks furnished to said user in an aurally distinct form from said utterances of said other words.

27. The system of claim 20 wherein said first and second signals are carried over a communications network, and further wherein at least a portion of a routing of said signals is based on a recognized hyperlink.

28. The system of claim 20 wherein vocabulary entries for said recognition means are selected to be a subset of aid hyperlinks furnished to said user.

29. The system of claim 20 further including means for selecting said at least two of said hyperlinks in accordance with a sliding window of time defining a subset of said plurality of hyperlinks said sliding window of time having a predetermined duration.

30. The system of claim 29 wherein said speech recognized selects a particular hyperlink as a recognition result from among said at least two of said hyperlinks based on how recently a portion of the first signal corresponding to a particular hyperlink within said sliding window of time was provided to said user.

31. The system of claim 20 wherein said hyperlink entries comprising said recognizer vocabulary for said speech recognizer are limited to a subset of said plurality of hyperlinks which have occurred in said first signal during a predefined interval.

32. The system of claim 31 wherein each of said hyperlink entries comprising said recognizer vocabulary has an equal likelihood of representing an unknown speech utterance in said second signal.

33. The system of claim 31 wherein any one of said hyperlink entries comprising said recognizer vocabulary has a likelihood of representing an unknown speech utterance in said second signal which is weighted according to a temporal position of said any one hyperlink in said predefined interval.

34. The system of claim 20 including a means for causing a predefined action to be carried out based on said recognized hyperlink.

35. The system of claim 20 further comprising a transaction initiator which initiates a transaction based on a recognized hyperlink.

36. The system of claim 20 further comprising a transaction processor for performing a transaction based on a recognized hyperlink.

37. A voiced information interface system comprising:
a database of information including text having one or more corresponding information links;
a means operating in conjunction with said database for causing information to be provided in voiced form;
a means for recognizing a voiced response by a user in relation to said provided information, said means for recognizing being more likely to recognize voiced information provided more recently by said means for causing information to be provided in voiced form than voiced information provided earlier by said means for causing information to be provided in voiced form; and
a means for shifting to information related to at least one of said information links in response to said recognized user response.

38. The voiced information interface system of claim 37 wherein said database of information is arranged as a plurality of information layers and a linkage between said information layers is provided by said information links.

39. The voiced information interface system of claim 38 wherein said information links are provided as identified information segments in a given information layer.

40. The voiced information interface system of claim 39 wherein said information in said given information layer is provided as a plurality of textual words.

41. The voiced information interface system of claim 39 wherein said voiced response by a user is constituted as a repeat of one of said identified information segments in said given layer.

42. The voiced information interface system of claim 37 wherein said means for causing information to be provided in voiced form includes a further means for causing said information links to be provided in an aurally distinct manner from other voiced information.

43. The voiced information interface system of claim 42 wherein said further means for causing said information links to be provided in an aurally distinct manner operates to cause said information links to be voiced in an opposite gender voice from that of said other voiced information.

44. The voiced information interface system of claim 37 wherein said voiced response by a user is constituted as a direction for a predefined action by said system.

45. The voiced information interface system of claim 37 including a further means to provide a confirmation of said voiced response to said user.

46. The voiced information interface system of claim 37 including a further means for providing to a user graphical information appearing in said database of information.

47. The voiced information interface system of claim 46 wherein said graphical information is provided to said user via a graphical access channel means.

48. A method for providing voiced access to stored information, wherein said information includes text having one or more corresponding information links, comprising the steps of:
causing at least a portion of said information to be provided in voiced form;
recognizing a voiced response by a user in relation to said provided information, a voiced response corresponding to information provided more recently being more likely to be recognized than a voiced response corresponding to information provided earlier; and
shifting to information related to at least one of said information links in response to said recognized user response.

49. The method for providing a voiced access to stored information of claim 48 wherein said information is arranged as a plurality of information layers and a linkage between said information layers is provided by said information links.

50. The method for providing a voiced access to stored information of claim 49 wherein said information links are provided as identified information segments in a given information layer.

51. The method for providing a voiced access to stored information of claim 50 wherein said information in said given layer is provided as a plurality of textual words.

52. The method for providing a voiced access to stored information of claim 50 wherein voiced response by a user is constituted as a repeat of one of said identified information segments in said given layer.

53. The method for providing a voiced access to stored information of claim 48 wherein said step of causing information to be provided in voiced form includes a substep of causing said information links to be provided in an aurally distinct manner from other voiced information.

54. The method for providing a voiced access to stored information of claim 53 wherein said substep of causing said information links to be provided in an aurally distinct manner operates to cause said information links to be voiced in an opposite gender voice from that of said other voiced information.

55. The method for providing a voiced access to stored information of claim 48 wherein said voiced response by a user is constituted as a direction for a predefined action.

56. The method for providing a voiced access to stored information of claim 48 including a further step of providing a confirmation of said voiced response to said user.

57. The method for providing a voiced access to stored information of claim 48 including a further step of providing to a user graphical information appearing in said stored information.

58. The method for providing a voiced access to stored information of claim 57 wherein said graphical information is provided to said user via a graphical access channel means.

59. A system for providing an interface to a stored database of information comprising:

a means for providing said database of information as a set of linked information layers, wherein said information is stored in an audio form;

a means for causing a particular layer of said information to be provided to a user;

a means for recognizing a voiced response by said user in relation to information in said particular layer, a voiced response corresponding to information provided more recently being more likely to be recognized than a voiced response corresponding to information provided earlier; and a means for operating on said recognized user response to effect a shift from said particular layer to a linked layer.

60. A system for providing an interface to a stored database of information comprising:

a means for establishing said database of information as a set of linked information layers, where linkage between such layers is related to linkage words in particular information layers;

a means operating in conjunction with said stored information layers for causing information in a given layer to be provided in voiced form, wherein said linkage words in said given layer are provided in an aurally distinct manner from other information in said given layer;

a means for recognizing a voiced response by a user in relation to one of said linkage words in said given layer, a voiced response corresponding to information provided more recently being more likely to be recognized relative to a voiced response corresponding to information provided earlier; and a means for operating on said recognized voiced user response to effect a shift from said given layer to another layer linked to said linkage word.

* * * * *

UNITED STATES PATENT AND TRADEMARK OFFICE
CERTIFICATE OF CORRECTION

PATENT NO. : 6,282,511 B1
DATED : August 28, 2001
INVENTOR(S) : Daniel Jitzchak Mayer It is certified that error appears in the above-identified patent and that said Letters Patent is hereby corrected as shown below:

Column 11, claim 3,
Line 45, the word "sad" should be -- said --.

Column 13, claim 28,
Line 13, the word "aid" should be -- said --.

Signed and Sealed this

Fifth Day of March, 2002

Attest:

Attesting Officer

JAMES E. ROGAN
Director of the United States Patent and Trademark Office